(12) United States Patent
Shumay

(10) Patent No.: US 9,098,508 B2
(45) Date of Patent: Aug. 4, 2015

(54) AGGREGATING IDENTIFIERS FOR MEDIA ITEMS

(71) Applicant: Electronic Arts Inc., Redwood City, CA (US)

(72) Inventor: Trenton Todd Shumay, Port Moody (CA)

(73) Assignee: Electronic Arts Inc., Redwood City, CA (US)

( * ) Notice: Subject to any disclaimer, the term of this patent is extended or adjusted under 35 U.S.C. 154(b) by 66 days.

(21) Appl. No.: 13/683,724

(22) Filed: Nov. 21, 2012

(65) Prior Publication Data

US 2014/0143212 A1    May 22, 2014

(51) Int. Cl.
G06F 17/30    (2006.01)

(52) U.S. Cl.
CPC ...... *G06F 17/3002* (2013.01); *G06F 17/30035* (2013.01)

(58) Field of Classification Search
CPC ............. G06F 21/10; G06F 17/30873; G06F 2216/15; G06F 17/30038; G06F 17/30542; G06F 17/30964; G06F 17/3002; G06F 17/30289; H04N 21/4532; H04N 21/4668; H04N 21/47208
USPC ............... 705/51, 310, 50, 1.1, 40, 59, 14.69, 705/14.7, 14.73, 26.1, 26.8, 34, 35, 400, 52, 705/64, 67, 71; 707/E17.009, E17.014, 707/769, 999.01, 999.107, E17.006, 707/E17.101, E17.116, 999.001, 999.003, 707/999.102, E17.019, E17.045, E17.102, 707/E17.108, E17.111, E17.143, 758, 780, 707/803, 999.005, 999.009, 999.1, 999.103, 707/999.104; 709/E17.014, 769, 999.01, 709/999.107, E17.006, E17.101, E17.116, 709/999.001, 999.003, 999.102, E17.019, 709/E17.045
See application file for complete search history.

(56) References Cited

U.S. PATENT DOCUMENTS

| | | | |
|---|---|---|---|
| 6,185,555 B1 * | 2/2001 | Sprenger et al. | 1/1 |
| 8,370,419 B2 * | 2/2013 | Muller et al. | 709/201 |
| 2007/0073767 A1 * | 3/2007 | Springer et al. | 707/103 R |
| 2007/0083558 A1 * | 4/2007 | Martinez | 707/104.1 |
| 2008/0288407 A1 * | 11/2008 | Hamel et al. | 705/50 |
| 2013/0103785 A1 * | 4/2013 | Lyon | 709/217 |

* cited by examiner

*Primary Examiner* — Jay Morrison
*Assistant Examiner* — Ken Hoang
(74) *Attorney, Agent, or Firm* — Lowenstein Sandler LLP

(57) ABSTRACT

A server device may receive multiple provider identifiers for a media item from multiple client devices. The multiple provider identifiers may each be associated with different media providers and may each be associated with the same media item. The server device may aggregate the multiple provider identifiers into entries in a data store. The server device may also analyze the entries in the data store and may request missing provider identifiers, merge entries that have duplicate information, and may indicate whether a media item is playable.

18 Claims, 8 Drawing Sheets

FIG. 2

DATA STORE 130

IDENTIFIER ENTRIES 131

| | Internal Identifier | Unique Identifier | Provider 1 Identifier | Provider 2 Identifier | ... | Provider N Identifier | Media Item Information | Play Information |
|---|---|---|---|---|---|---|---|---|
| ENTRY 211A | A00000001 | US-F3Q-12-00021 | P1-000001 | P2-000001 | ... | PN-000001 | Arist 1, Title 1, Year 1, Publisher 1, Compser 1, Track 1 | US, CA |
| ENTRY 211B | A00000002 | CA-G9Z-11-05364 | P1-000002 | | ... | PN-000002 | Arist 2, Title 2, Year 2, Publisher 2, Compser 2, Track 2 | |
| ENTRY 211C | B00000123 | UK-X4L-06-08371 | | P2-000003 | ... | | Arist 3, Title 3, Year 3, Publisher 3, Compser 3, Track 3 | US, CA, CN, UK |
| ENTRY 211D | F032Z8754 | UK-X4L-06-08371 | P1-000004 | | ... | PN-000004 | Arist 3, Title 3, Year 3, Publisher 3, Compser 3, Track 3 | US |
| ENTRY 211X | XP8999K14 | GN-O9C-93-37195 | P1-00000X | P2-00000X | ... | | Arist X, Title X, Year X, Publisher X, Compser X, Track X | Provider 1, Provider N |

AGGREGATING IDENTIFIERS FOR MEDIA ITEMS

TECHNICAL FIELD

This disclosure relates to the field of media items and, in particular, to managing identifiers for media items.

BACKGROUND

Users often employ various computing devices (e.g., computer systems, smart phones, laptop computers, tablet computers, netbook computers, desktop computers, server computers, personal digital assistants (PDAs), cell phones, smart phones, etc.) for various purposes. Many users consume (e.g., view, watch, listen, hear, or read) media items, such as digital music (e.g., music tracks, songs, or audio clips), digital videos, digital images, electronic books (e.g., ebooks), electronic newspapers, electronic magazines, and other electronic reading material, using computing devices. For example, a user may listen to digital music using a smart phone, view a digital video using a tablet computer, or read an ebook using a tablet computer. The media item may be a streaming media item or a locally stored media item. A streaming media item may include content that is not stored locally on a computing device in advance, but rather, is received by and presented to the user while being obtained from another computing device (e.g., a server). A user may begin consumption of the streaming media item (e.g., begin viewing or playback) before receiving the entire media item. A locally stored content may be stored in a local memory (e.g., a hard disk) of the computing device.

A user may access media items through a media provider. A media provider may be a company, a publisher, a content provider, etc., that provides access to different media items. For example, Apple iTunes® store is a media provider that provides access to media items (e.g., digital music, digital videos, electronic books, etc.). As the amount and variety of media items increases, users may use multiple media providers to consume media items (e.g., to access media items). For example, a user may use both the Apple iTunes® store and the Spotify® music service to listen to digital music.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only.

FIG. 2 is a diagram illustrating identifier entries in a data store, according to one embodiment.

DETAILED DESCRIPTION

Figure 1A:
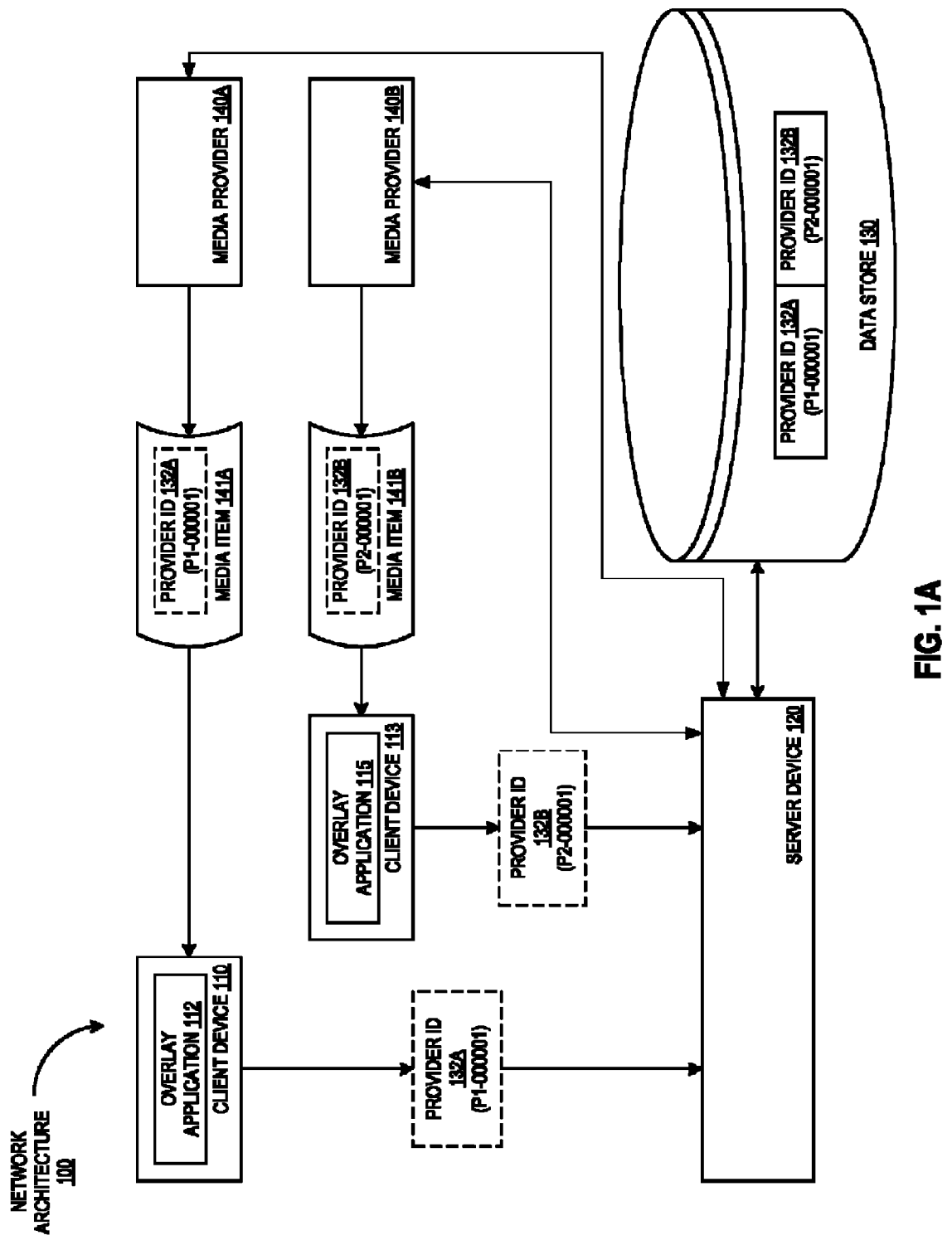
FIG. 1A is a block diagram illustrating a first example network architecture in which embodiments of the disclosure may operate.

Systems and methods in accordance with various embodiments of the present disclosure provide the ability to aggregate or manage different identifiers for media items, such as music tracks. Users may now access multiple music tracks from multiple media providers (e.g., the Apple iTunes® store, the Rdio® music service, etc.). In order to provide easier access to the multiple media tracks from multiple media providers, users may use an overlay application that allows the users to retrieve, access, or consume the music tracks. For example, the overlay application may receive different sets of login information (e.g., username, password, etc.) for different media providers. The overlay application may login to each of the different media providers so that the user can consume (e.g., listen to) music tracks from each of the media providers through the overlay application. The overlay application may provide a portal or a gateway that allows a user to consume music tracks from multiple media providers.

Different content providers, publishers, or other entities may want to identify the different music tracks that are being consumed by users. As the overlay application consumes a media item from a media provider, the overlay application may receive an identifier for the music track from the media provider. The identifier that is used by a particular media provider for the music track may be referred to as a provider identifier. Different media providers may have different provider identifiers for the same music track. For example, the Apple iTunes® store may use a first alphanumeric string as provider identifier for Beethoven's $9^{th}$ Symphony, and Amazon® may use a second, different alphanumeric string as a provider identifier for the same song (e.g., for Beethoven's $9^{th}$ Symphony). The overlay applications on different client devices may provide these different provider identifiers to a server or an application on a server that may aggregate the different provider identifiers for the same music track into entries in a data store (e.g., entries in a database).

The server (or application) may aggregate the different provider identifiers using unique identifiers for the media items (e.g., an International Standard Recording Code (ISRC)) to determine that different provider identifiers from different media providers refer to the same music track. The server (or application) may also use metadata for a music track (e.g., a unique identifier, the artist, the title, the date of release, the album, etc.) to determine whether different provider identifiers from different media providers refer to the same music track. The server (or application) may further analyze the entries in the data store to remove entries that have duplicate information and to obtain any missing information in the entries (e.g., entries that are missing a provider identifier for a media provider). Aggregating and managing the different identifiers may allow content providers, publishers, or other entities to more easily identify music tracks that users are consuming and may also reduce the amount of space (e.g., storage space) used by the data store. Although the present disclosure may refer to media items as digital music (e.g., music tracks or songs), digital videos, or electronic books as media items, it should be understood that a media item may be any form of electronic media, including, but not limited to, digital music, digital videos, digital images, electronic books, electronic newspapers, electronic magazines, and other electronic reading material.

FIG. 1A is a block diagram illustrating a first example network architecture 100 in which embodiments of the disclosure may operate. The network architecture 100 includes a client device 110, a client device 113, a server device 120, and media providers 140A and 140B that are communicatively coupled to each other (e.g., coupled to teach other via a network). The media providers 140A and 140B may be different companies, publishers, content providers, vendors, etc., that provide access to media items (e.g., the Apple iTunes® store, the Spotify® music service, the Rdio® music service, etc.). The network architecture 100 also includes a data store 130 that is communicatively coupled to the server device 120. The client devices 110, 113, and the server device 120 may be computing devices (e.g., a desktop computer, a laptop computer, a mainframe computer, a server computer, a smart phone, etc). The data store 130 may be a memory (e.g., a hard drive, a flash drive, a database system, etc.).

The media provider 140A provides (e.g., transmits or sends) media item 141A (e.g., a music track or a song) to the client device 110. The media provider 140B provides the media item 141B (e.g., which is the same music track) to the client device 113. The media item 141A includes a provider identifier 132A (e.g., the text value P1-000001). The media item 141B includes a provider identifier 132B (e.g., the text value P2-000001). The provider identifier 132A may be an identifier used by media provider 140A to refer to media item 141A and the provider identifier 132B may be an identifier used by media provider 140B to refer to media item 141B, which are both the same media item (e.g., the same music track). As overlay applications 112 and 115 consume (e.g., play, view, display, etc.) media items 141A and 141B, they may send the provider identifiers 132A and 132B to the server 120.

The server device 120 may track the different media items that are viewed by different overlay applications. When tracking the different media items, the server device 120 will receive both the provider identifiers 132A and 132B. The server device 120 may use a combination of media data (e.g., music track name, artist for the music track, date of release, etc.) or unique identifiers (e.g., an ISRC) to determine whether the two provider identifiers 132A and 132B refer to the same media item (e.g., the same music track). The server device 120 may request one or more of the media data and the unique identifier from the media providers 140A and 140B. In one embodiment, the server device 120 may aggregate or combine the two different provider identifiers 132A and 132B (which refer to the same music track) into a single entry. This may allow the server device 120 to more easily determine when the two clients 110 and 113 consume the same media item (e.g., the same music track) from different media providers 140A and 140B. This may also allow the server device 120 to reduce the number of entries and storage space used by the data store 130. In one embodiment, the server device 120 may also periodically analyze entries in the data store 130 to remove entries that may contain duplicate information (e.g., to merge two entries that refer to the same music track into a single entry) and to obtain information that may be missing from the entries (e.g., a missing provider identifier for a music track).

Figure 1B:
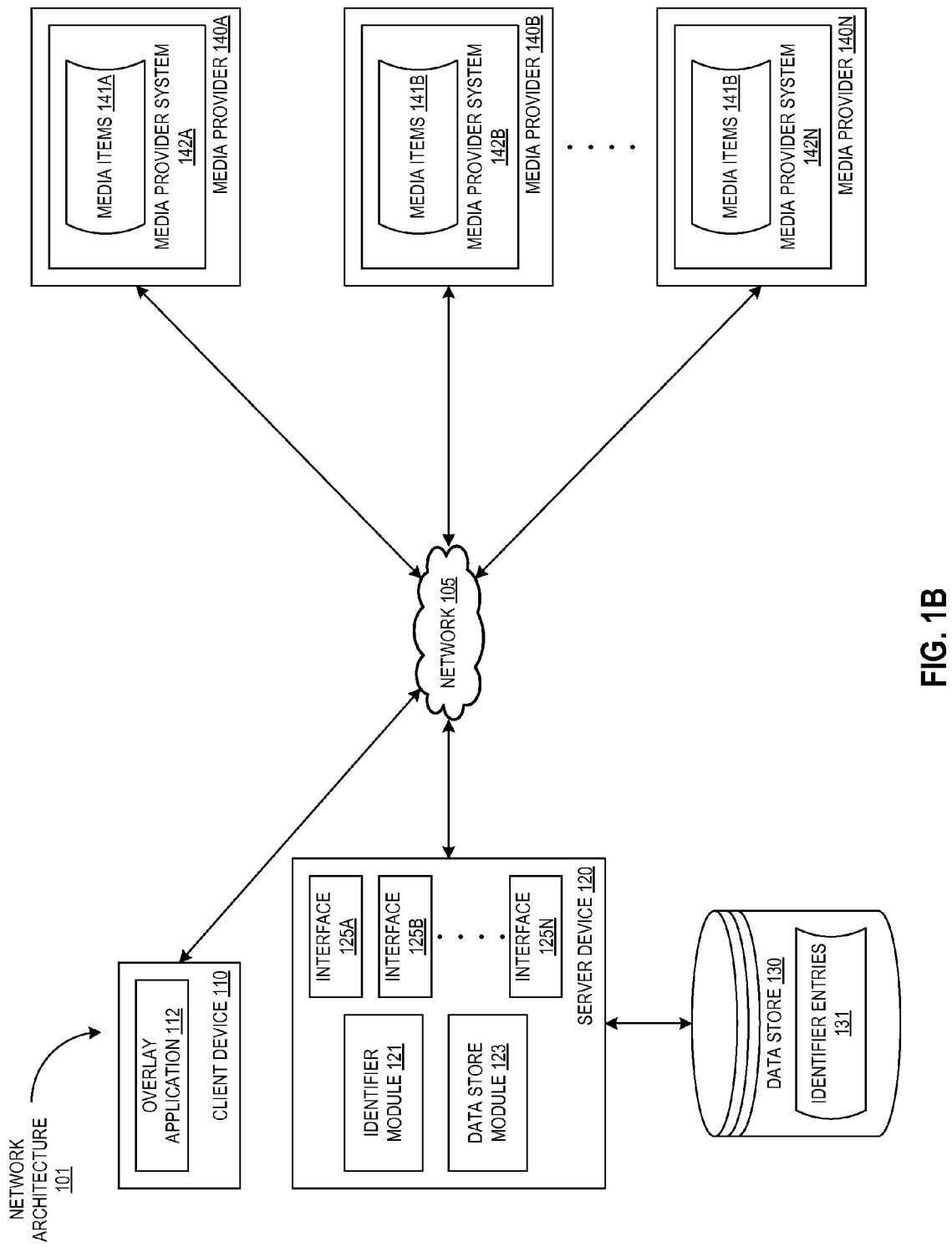
FIG. 1B is a block diagram illustrating a second example network architecture in which embodiments of the disclosure may operate.

FIG. 1B is a block diagram illustrating a second example network architecture 101 in which embodiments of the disclosure may operate. The network architecture 101 includes a client device 110, a server device 120, and media providers 140A through 140N, that are communicatively coupled to a network 105. The network architecture 101 also includes a data store 130 that is communicatively coupled to the server device 120. The client device 110 and the server device 120 may be computing devices such as a desktop computer, a laptop computer, a mainframe computer, a server computer, a personal digital assistant (PDA), smart phone, a netbook computer, a tablet computer, etc. Network 105 may one or more of a public network (e.g., the Internet), a private network (e.g., a local area network (LAN) or wide area network (WAN)), a wired network (e.g., Ethernet network), a wireless network (e.g., an 802.11 network), a cellular network (e.g., a Long Term Evolution (LTE) network), a broadcast network, or a combination thereof. The data store 130 may be a memory (e.g., random access memory), a cache, a drive (e.g., a hard drive), a flash drive, a database system, or another type of component or device capable of storing data. The data store 130 may also include multiple storage components (e.g., multiple drives or multiple databases) that may also span multiple computing devices (e.g., multiple server computers).

The media providers 140A through 140N may be different companies, publishers, content providers, vendors, etc., that provides access to media items. Examples of media providers include, but are not limited to, the Apple iTunes® store, the Spotify® music service, the Pandora® internet radio service, the Rdio® music service, the Rhapsody® music service, the Napster® music service, the Hulu® video service, the Vimeo® video service, the NetFlix® music service, etc. Each media provider 140A through 140N includes a corresponding media provider system 142A through 142N. The media provider systems 142A through 142N may be components or infrastructures that are used to provide the media items to users or client devices. For example, the media provider system 142A may include various software components (e.g., applications, services, etc.), hardware components (e.g., server computers, databases, storage drives, etc.), or network components (e.g., routers, switches, different networks, etc.) that are used to transmit a media item to the client device 110.

The client device 110 includes an overlay application 112. As discussed above, the overlay application 112 may provider a user with a portal or gateway (e.g., a single point of access) to consume or access media items 141A through 141N from the media providers 140A through 140N. For example, the user may use the overlay application 112 to listen to a digital media item 141A (e.g., listen to digital music) from media provider 140A, view a digital media item 141B (e.g., view a digital video) from media provider 140B, and read a digital media item 141C (e.g., read an electronic book) from media provider 140N). Although only one client device 110 is illustrated in FIG. 1B, the network architecture 101 may include multiple client devices, each device including an overlay application. Each of the multiple client devices may access media items 141A through 141N from the media providers 140A through 140N. As the overlay application 112 consumes (e.g., accesses) a media item from a media provider, the overlay application may receive a provider identifier (e.g., text, a string, a number, an alphanumeric value, etc.) associated with the media item from the media provider. The overlay application may provide or transmit the provider identifier to the server device 120.

The server device 120 includes an identifier module 121, a data store module 123, and interfaces 125A through 125N. The identifier module 121 may receive the provider identifiers from overlay application 112 or from other overlay applications on other client devices (as illustrated in FIG. 1A). The identifier module 121 may receive data indicating which of the media providers 140A through 140N a provider identifier is associated with, or the identifier module 121 may analyze the provider identifier and may determine which of the media providers 140A through 140N a provider identifier is associated with, based on the format or content of the media identifier. In one embodiment, the identifier module 121 may aggregate the different provider identifiers in the identifier entries 131 in the data store 130. The identifier module 121 may determine whether a provider identifier, for a media item, received from an overlay application 112 already exists in an entry in the identifier entries 131. If the provider identifier does not exist in an entry, the identifier module 121 may request media item metadata (e.g., data that may indicate additional information associated with a media item, such as a unique identifier for the media item, or media data, such as the name for the media item, the artist for the media item, etc.) from the media provider that provided the media item to the overlay application 112. For example, the identifier module 121 may request media item metadata for media item 141A that was provided to the overlay application 112, by the media provider 140A. The media item metadata may include one or more of the unique identifier and media data. The media data may indicate additional information associated with the media item, such as an artist, a title, an album, a publisher, a label, a track number, a date, a genre, a composer, a studio, a director, or a production company, for the media item. In one embodiment, the media item metadata may be embedded or included in a media item. For example, the metadata may be ID3 metadata that is embedded in an MPEG Layer III (MP3) music file (e.g., a media item). The overlay client 112 may access the media item metadata embedded in the media item and may provide the embedded media item metadata to the identifier module 121.

The identifier module 121 may use interface 125A to communicate with the media provider 140A. The interface 125A may be one or more of a programming interface (e.g., an application programming interface (API)), a communication interface, software (e.g., an application or module), hardware, or any component that may be used to communicate data with media provider 140A. For example, the interface 125A may provide the identifier module 121 with an interface to request and receive the media item metadata or unique identifiers from the media provider 140A. Each of the interfaces 125B through 125N may be used to communicate data with one or media providers 140B through 140N, respectively. For example, interface 125B may be used to communicate data with media provider 140B. In one embodiment, new media providers may be added to the network architecture 101. A new interface may be added to the server device to communicate data with the new media provider and the server device (e.g., the identifier module 121 or the data store module 123) may use the new interface to communicate data with the new media provider.

In one embodiment, the identifier module 121 may analyze the media item metadata associated with a media item to determine whether the media item metadata includes a unique identifier. A unique identifier for a media item may be an identifier (e.g., a string, a number, text, an alphanumeric value, etc.) that may uniquely identify the media item across multiple media providers (e.g., may uniquely identifier a media item across media providers 140A through 140N). Examples of unique identifiers include, but are not limited to, ISRC (e.g., for digital music such as digital music tracks or audio clips), an international standard audiovisual number (ISAN) (e.g., for digital videos), an international standard book number (ISBN) (e.g., for electronic publications), an international standard serial number (ISSN), an international standard music number (ISMN), an international standard musical work code (ISWC), an international standard text code (ISTC), a digital object identifier (DOI), or an international standard name identifier (ISNI), etc.

In one embodiment, if the media item metadata includes a unique identifier (e.g., includes an ISRC), the identifier module 121 may analyze the identifier entries 131 to determine whether the unique identifier exists in the identifier entries 131. If the unique identifier does exist in an entry in the identifier entries 131, the identifier module 121 may add the provider identifier (received from the overlay application 112) to the entry in the identifier entries 131. If the unique identifier does not exist in any of the identifier entries, the identifier module 121 may create a new entry and may add the unique identifier and the provider identifier (received from the overlay application 112) to the new entry. In one embodiment, the identifier module 121 may also create an internal identifier (e.g., an identifier that is not unique across media providers or that is not received from a media provider) and may add the internal identifier to the new entry. The internal identifier may also be an identifier that is used by the server device 120 to access or refer to an entry in the identifier entries 131. In another embodiment, the identifier module 121 may also add the media data (e.g., artist, title, date of release, etc.) for the media item, to the new entry.

In one embodiment, if the media item metadata does not include a unique identifier, the identifier module 121 may analyze the media metadata to obtain media data (e.g., the title, the artist, the date or release, etc.) associated with the media item. The identifier module 121 may analyze the identifier entries 131 to determine whether any entries include the media data. For example, the identifier module 121 may analyze the identifier entries to determine whether any of the entries have the same artist and name (e.g., title) for the media item. In one embodiment, if there is an entry in the identifier entries 131 that includes the media data, the identifier module 121 may add the provider identifier (received from the overlay application 112) to the entry that includes the media data. If there is no entry in the identifier entries 131 (e.g., no entry that has the same artist and same song name), the identifier module 121 may create a new entry and may add the provider identifier to the entry. In one embodiment, the identifier module 121 may also create an internal identifier and may add the internal identifier to the new entry. The identifier module 121 may also add the media data (e.g., artist, title, date of release, etc.) for the media item, to the new entry.

In one embodiment, the data store module 123 may analyze the identifier entries 131 in the data store 130 and remove entries that have duplicate information. For example, the data store module 123 may combine (e.g., merge) two entries that include the same unique identifier but have different provider identifiers from different media providers. In another embodiment, the data store module 123 may also analyze the identifier entries 131 in the data store to determine whether any entries are missing provider identifiers. For example, an entry may not have a provider identifier from a particular media provider. The data store module 123 may query or request the provider identifier from the media provider. The data store module 123 may add the provider identifier received from the media provider to the entry that is missing the provider identifier.

In one embodiment, the data store module 123 may receive data from overlay applications (e.g., overlay application 112) on client devices (e.g., client device 110) indicating whether a media item is playable. For example, overlay application may send data indicating that media item 141N (e.g., a streaming music track) is no longer playable. The media item 141N may be unplayable because the media provider 140N may no longer provide the media item 141N to its users (e.g., the media provider 140N may no longer have a license to provide the media item 141N, may have offered the media item 141N for a specific period of time, etc.). The data store module 123 may update an entry (in the identifier entries 131) that is associated with the media item, to indicate that the media item is no longer playable. For example, an entry may also include a list of countries in which the track is still playable. In another example, an entry may also include a list of which of the media providers 140A through 140N are still able to provide the media item (e.g., a list of the media providers 140A through 140N from which the overlay application is able to play the media item). In one embodiment, the data store module 123 may periodically analyze the identifier entries 131 (e.g., once every hour, once every day, once a week, once a month, etc.). The data store module 123 may also periodically remove entries that have duplicate information, obtain missing providers identifiers, and update entries to indicate that media items associated with the entries are no longer playable.

FIG. 2 is a diagram illustrating identifier entries 131 in a data store 130, according to one embodiment. The identifier entries 131 shown in FIG. 2 are represented using a table. In other embodiments, the identifier entries 131 may be represented using other data structures or representations, such as graphs, lists, charts, trees, etc.

The identifier entries 131 include multiple individual entries, entry 211A through 211X. Each entry 211A through 211X may be associated with a media item. For example, entry 211A may be associated with a digital music track. In another example, entry 211B may be associated with a digital video. In a further example, entry 211C may be associated with an electronic publication (e.g., an ebook). Each entry 211A through 211X includes multiple fields. The first field (e.g., the first column of the identifier entries 131) indicates an internal identifier for the media item associated with the entry. For example, entry 211A has an internal identifier of "A00000001." The second field (e.g., the first second of the identifier entries 131) indicates a unique identifier (e.g., an ISAN, an ISRC, an ISBN, etc.) for the media item associated with the entry. For example, entry 211A has a unique identifier of "CA-G9Z-11-05364." Each entry also includes multiple provider identifier fields. Each provider identifier field includes a provider identifier received from a media provider for the media item associated with the entry. For example, the entry 211B includes provider identifier "P1-000002" that was received from a first media provider (e.g., media provider 140A as illustrated in FIG. 1B). In another example, the entry 211A includes provider identifier "P1-000002" that was received from a second media provider (e.g., media provider 140B as illustrated in FIG. 1B). In a further example, the entry 211D includes a provider identifier from a third media provider (e.g., media provider 140N as illustrated in FIG. 1B).

The internal identifier, the unique identifiers, and the provider identifiers may be any number, text, alphanumeric string, value, or data that is used to identify a media item. In one embodiment, the different identifiers (e.g., the internal identifiers, the unique identifiers, the provider identifiers, etc.) may be generated using various algorithms, functions, or operations. For example, a provider identifier may be a hash that is obtained and/or generated by applying or using a hashing algorithm, function, and/or operation on a media item (e.g., a secure hash algorithm (SHA), such as SHA-1, SHA-2, SHA-3), a message digest algorithm (e.g., MD-2 through MD-6), a hash-based message authentication code (HMAC), a cyclic redundancy check (CRC), cryptographic hashing algorithms, non-cryptographic hashing algorithms, etc.) In another embodiment, the different identifiers may be generated based on a specific format or a standard format. For example, the unique identifier may be an ISRC code that has the following format CC-RRR-YY-DDDDD, where "CC" is a two character portion that indicates the country where the media item may be distributed, "RRR" is a three character portion that indicates the entity or company that may own or release the media item, "YY" is a two character portion that indicates the year that the unique identifier was created, and "DDDDD" is a five character portion that may indicate a designation or a code for the media item, selected by the entity or company that may own or release the media item.

Each entry 211A through 211X also includes a "Media Item Information" field (e.g., the second to last column in the identifier entries 131). The "Media Item Information" field may include media data associated with the media item. The media data may include, but is not limited to, an artist for the media item, a title for the media item, an album for the media item (e.g., the name of an album or collection that includes the media item), a publisher for the album (e.g., the name of a company that released the media item), a label (e.g., the name of a company that released the media item), a track number (the track number within an album for the media item), a date (e.g., the date that the media item was released), a genre (e.g., the genre of the media item, such as "Classical Music" or "Sci-Fi Movie"), a composer (the name of the composer who created or composed the media item), a studio (the name of the studio which produced the media item), a director (the name of the person who directed the media item), a production company (the name of a company that produced the media item), etc.

Each entry 211A through 211X further includes a "Play Information" field (e.g., the last column in identifier entries 131). The "Play Information" field may include a list one or more countries or media providers that allow the media item to be consumed e.g., played, viewed, read, etc.). For example, the "Play Information" field for the entry 211A indicates that the media item associated with entry 211A may be played in the United States (US) and Canada (CA). In another example, the "Play Information" field for the entry 211C indicates that the media item associated with the entry 211C may be played in the US, in CA, in China (CN), and in the United Kingdom (UK). In a further example, the "Play Information" field for the entry 211X indicates that the media item associated with the entry 211X is playable when the media item is accessed via the media provider "Provider 1" and "Provider N." In yet another example, the "Play Information" field for the for entry 211B is blank (e.g., does not contain a list of countries or media providers). This may indicate that the media item associated with the entry 211B is not playable in any countries and is not playable from any media provider (e.g., the media item was deleted, is no longer produced or released, etc.).

As illustrated in FIG. 2, some of the entries (e.g., entry 211B, entry 211X) may be missing information for certain fields. In addition, some of the entries (e.g., entry 211C, entry 211D) include duplicate information. As discussed in more detail below in conjunction with FIGS. 4 and 6, a data store module may analyze the identifier entries 131 to determine whether any entries are missing information (e.g., missing a provider identifier) or whether any entries contain duplicate information. The data store module may request the missing information from one or more media providers (e.g., may request a provider identifier for a media item, from a media provider) or may remove entries that have duplicate information (e.g., may merge two entries that have duplicate information).

Figure 3:
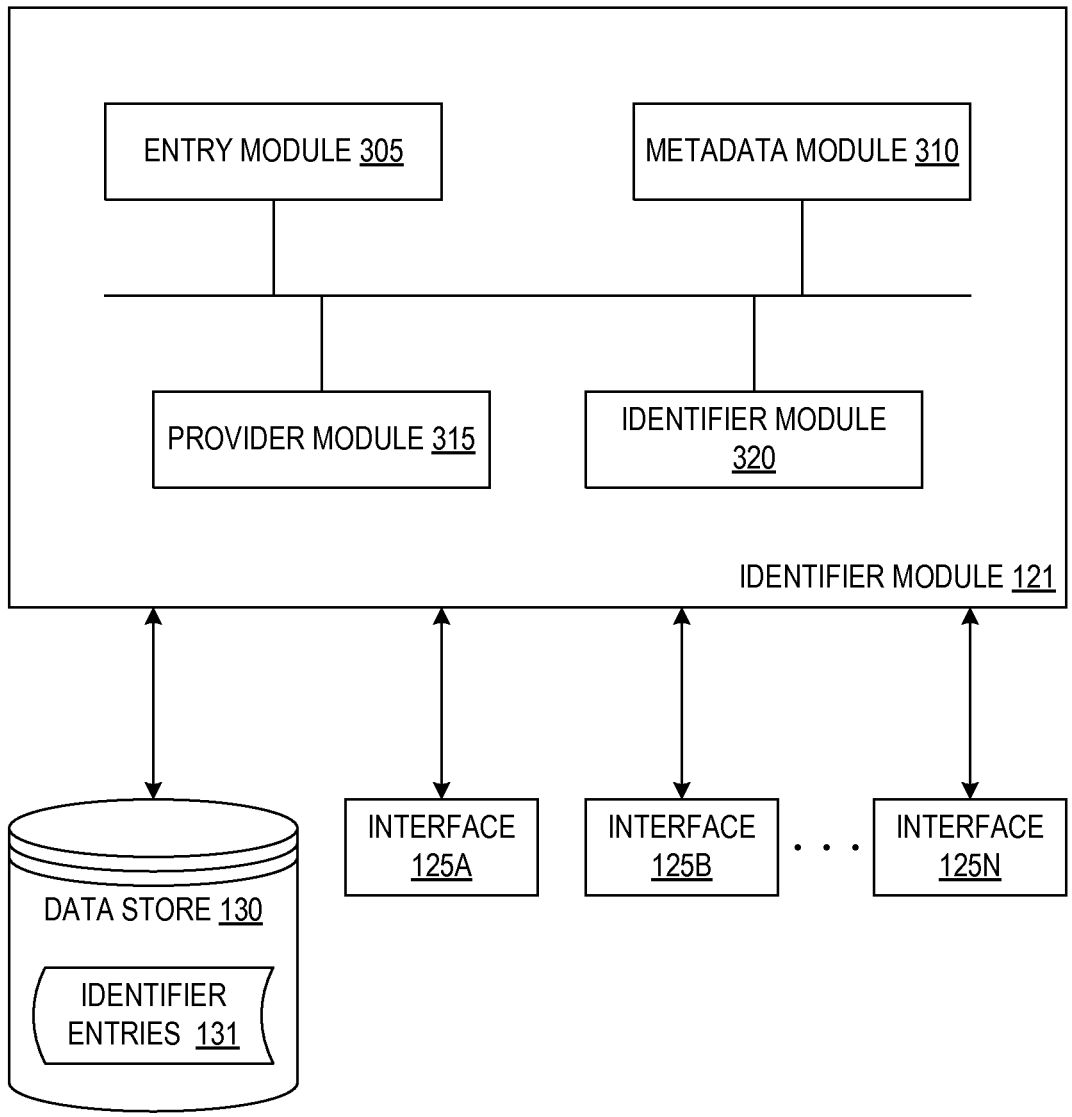
FIG. 3 is a block diagram illustrating an identifier module, according to one embodiment.

FIG. 3 is a block diagram illustrating an identifier module 121, according to one embodiment. The identifier module 121 includes an entry module 305, a metadata module 310, a provider module 315, and an identifier module 320. More or less components may be included in the identifier module 121 without loss of generality. For example, two of the modules may be combined into a single module, or one of the modules may be divided into two or more modules. In one embodiment, one or more of the modules may reside on different computing devices (e.g., different desktop or laptop computers). The identifier module 121 is communicatively coupled to the data store 130. For example, the identifier module 121 may be directly coupled to the data store 130 or may be coupled to the data store 130 via one or more networks. The data store 130 includes identifier entries 131 (e.g., entries for media items that include different identifiers, media data, or data indicating whether the media items are playable).

In one embodiment, the provider module 315 may be used by the identifier module 121 to communicate with different media providers (e.g., media providers 140A through 140N illustrated in FIG. 1B). The provider module 315 may request media item metadata from a media provider using a provider identifier for the media item. For example, the provider module 315 may send a media provider the provider identifier associated with a media item and associated with the media provider, and may request media item metadata for the media item. The provider module 315 may also request provider identifiers from a media provider. For example, the provider module 315 may send a media provide a unique identifier (e.g., an ISRC, an ISAN, etc.) for a media item, and may request the provider identifier (used by the media provider) for the media item. The provider module 315 may use one or more of the interfaces 125A through 125N to communicate with different media providers. For example, referring to FIG. 1B, the provider module 315 may use interface 125A to communicate with media provider 140A, interface 125B to communicate with media provider 140B, etc. As discussed above, the interfaces 125A through 125N may be may be one or more of a programming interface (e.g., an API), a communication interface, software (e.g., an application or module), hardware, or any component that may be used to communicate data with different media providers.

In one embodiment, the metadata module 310 may be used by the identifier module 121 to process or analyze media item metadata that is received from a media provider. The metadata module 310 may analyze media item metadata to determine whether the media item metadata includes a unique identifier (e.g., an ISRC, an ISAN, an ISBN, etc.). The metadata module 310 may also analyze the media item metadata to obtain media data, such as the artists, title, track number, album, etc., for a media item. In one embodiment, the identifier module 320 may generate internal identifiers for entries. Internal identifiers may be identifiers that are not universally unique across media providers or that are not received from a media provider. An internal identifier may be an identifier used by the identifier module 121 when the identifier module 121 access or refers to identifier entries 131 in the data store 130. As discuss, various methods, algorithms, operations, or functions may be used to generate internal identifiers (e.g., hash algorithms, pseudo-random number generates (PRNG), etc.)

In one embodiment, entry module 305 may be used to analyze and update entries in the identifier entries 131. The entry module 305 may analyze the identifier entries 131 to determine whether a provider identifier exists in any field or portion of the identifier entries 131. For example, referring back to FIG. 2, the entry module 305 may determine whether the provider identifier "P2-000003" exists in any fields (e.g., any portion) of the entries in the identifier entries 131. The entry module 305 may also analyze the identifier entries 131 to determine whether a unique identifier exists in any field or portion of the identifier entries 131. For example, referring back to FIG. 2, the entry module 305 may determine whether the unique identifier "UK-X4L-06-08371" exists in any fields (e.g., any portion) of the entries in the identifier entries 131. The entry module 305 may further analyze the identifier entries 131 to determine whether a particular media data (e.g., a particular artist and title) exists in any field or portion of the identifier entries 131. For example, referring back to FIG. 2, the entry module 305 may determine whether the artist "Artist 1" and the title "Title 1" exist in any fields (e.g., any portion) of the entries in the identifier entries 131.

The entry module 305 may also create new entries and may add different identifiers (e.g., a unique identifier, an internal identifier, a provider identifier) into the new or existing entries. For example, the entry module 305 may receive a provider identifier from a media provider. The entry module 305 may determine that the provider identifier is associated with a unique identifier and may identify an entry that includes the unique identifier. The entry module 305 may add the provider identifier to the entry. In another example, the entry module 305 may determine that the unique identifier for a media item does not exist in the identifier entries 131. The entry module 305 may create a new entry and may add the unique identifier, an internal identifier, and a provider identifier (received from a media provider) to the new entry.

Figure 4:
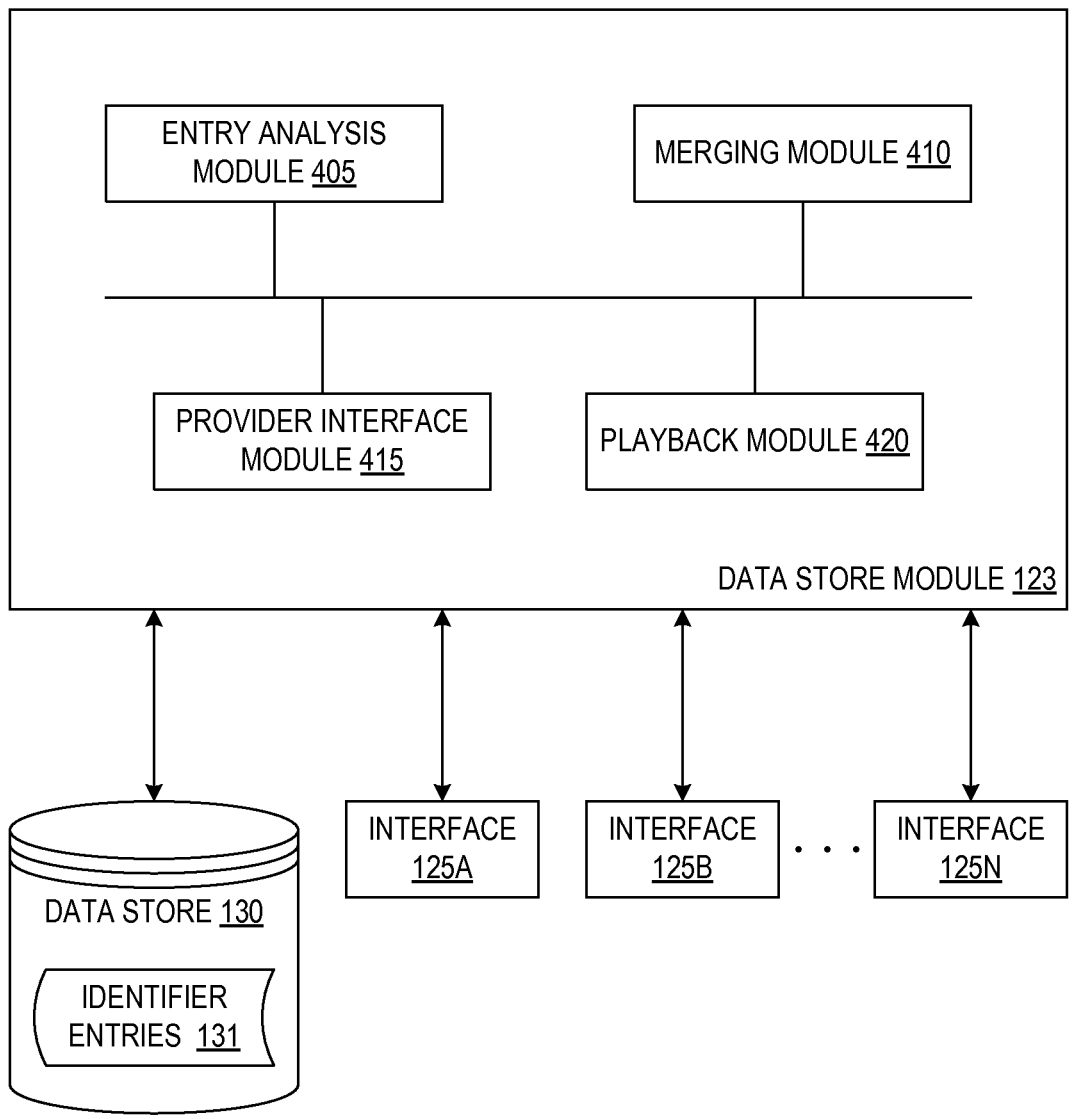
FIG. 4 is a block diagram illustrating a data store module, according to one embodiment.

FIG. 4 is a block diagram illustrating a data store module 123, according to one embodiment. The data store module 123 includes an entry analysis module 405, a merging module 410, a provider interface module 415, and a playback module 420. More or less components may be included in the data store module 123 without loss of generality. For example, two of the modules may be combined into a single module, or one of the modules may be divided into two or more modules. In one embodiment, one or more of the modules may reside on different computing devices (e.g., different desktop or laptop computers). The data store module 123 is communicatively coupled to the data store 130. For example, the data store module 123 may be directly coupled to the data store 130 or may be coupled to the data store 130 via one or more networks. The data store 130 includes identifier entries 131 (e.g., entries for media items that include different identifiers, media data, or data indicating whether the media items are playable).

In one embodiment, the provider interface module 415 may be used by the identifier module 121 to communicate data with different media providers (e.g., media providers 140A through 140N illustrated in FIG. 1B). The provider module 315 may use one or more of the interfaces 125A through 125N to communicate with different media providers. In one embodiment, the entry analysis module 405 may analyze the identifier entries to determine whether an entry is missing a provider identifier for a media provider and may request the missing provider identifier from the media provider. For example, referring back go FIG. 2, the entry analysis module 405 may analyze the identifier entries 131 and may determine that the entry 211C is missing a provider identifier from the media provider "Provider 1." The entry analysis module 405 may obtain the unique identifier for the entry 211C (e.g., "UK-X4L-06-08371") and send a request to the media provider "Provider 1" for the provider identifier. The entry analysis module 405 may include the unique identifier as part of the request for the provider identifier (e.g., so that the media provider may locate the correct media item). The entry analysis module 405 may use the provider interface module 415 to request the provider identifier.

In one embodiment, the merging module 410 may analyze the identifier entries 131 and determine whether the identifier entries 131 has any entries that have duplicate information (e.g., duplicate identifiers, duplicate media data, etc.). The merging module 410 may remove entries that have duplication information by combining the entries into a single entry (e.g., combining the duplicate entries into an existing entry or creating a new entry using the information from the duplicate entries). For example, referring to FIG. 2, the merging module 410 may determine that the entry 211C and 211D include duplicate information (e.g., both the entry 211C and 211D include the same unique identifier "UK-X4L-06-08371" or include the same media data, such as artist, title, etc.). The merging module 410 may merge entry 211D into entry 211C by adding the provider identifiers "P1-000004" and "PN-000004" to the entry 211C and deleting the entry 211D. The internal identifier "F032Z8754" may later be re-used in the identifier entries 131 after the entry 211D is deleted or removed.

In one embodiment, the playback module 420 may update entries in the identifier entries 131 to indicate whether the media items associated with the entries are playable. The playback module 420 may update the entries based on data received from overlay applications on client devices. For example, referring back to FIG. 2, an overlay application may indicate (e.g., send data or other information to indicate) that the media item associated with the entry 211D is no longer playable in the United States. The playback module 420 may update the "Play Information" field in the entry 211D to indicate that the media item associated with the entry 211D is no longer playable in the United States (e.g., by removing the text "US" from the "Play Information" field).

Referring to FIGS. 3 and 4, in one embodiment, the identifier module 121 and the data store module 123 may be combined into a single application, module, or component on a server device. The different modules in the identifier module 121 and the data store module 123 may be combined, merged or included in the single application, module, or component on the server device 120.

Figure 5:
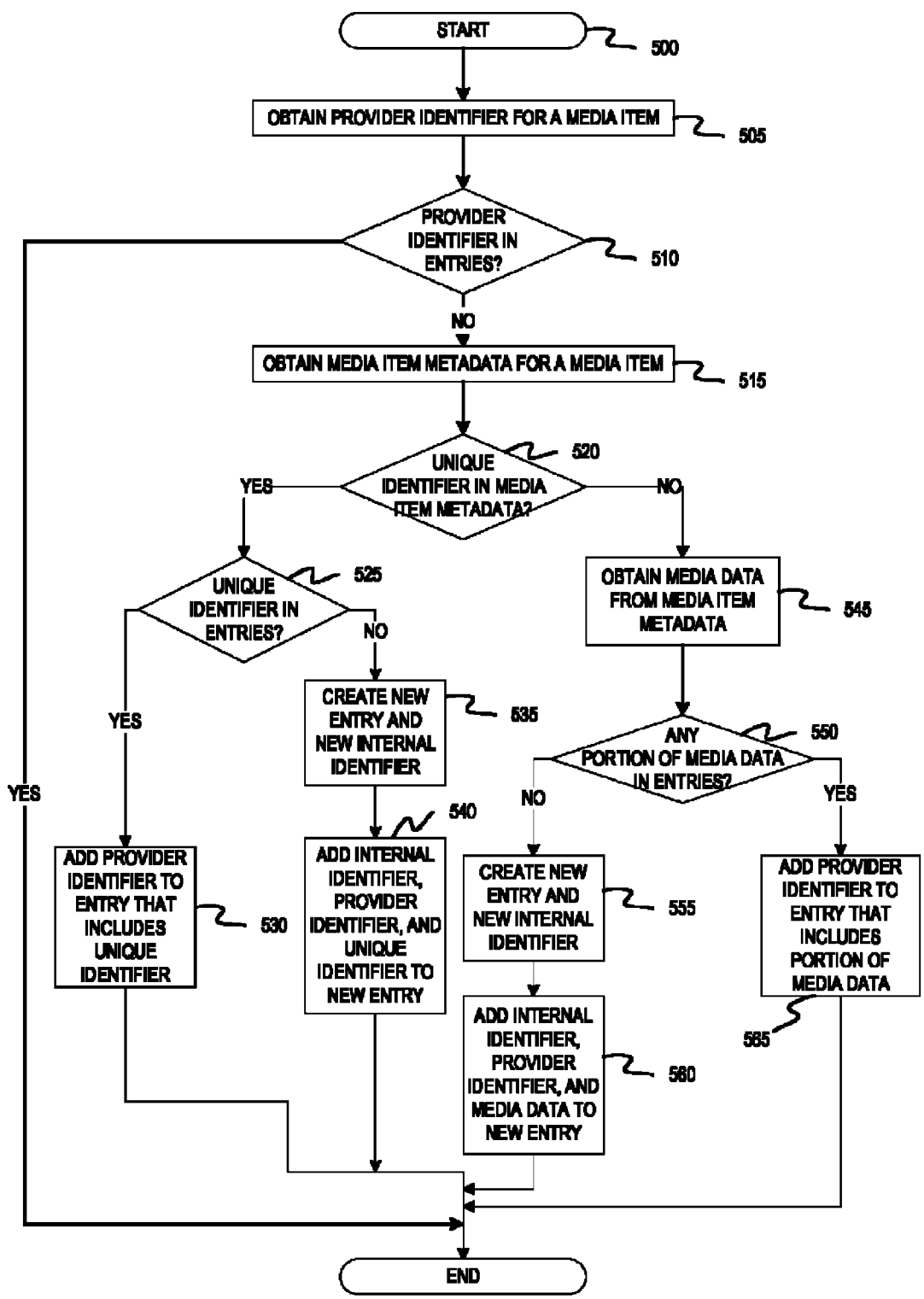
FIG. 5 is a flow diagram illustrating a method of aggregating or managing identifiers for media items, according to one embodiment.
Figure 6:
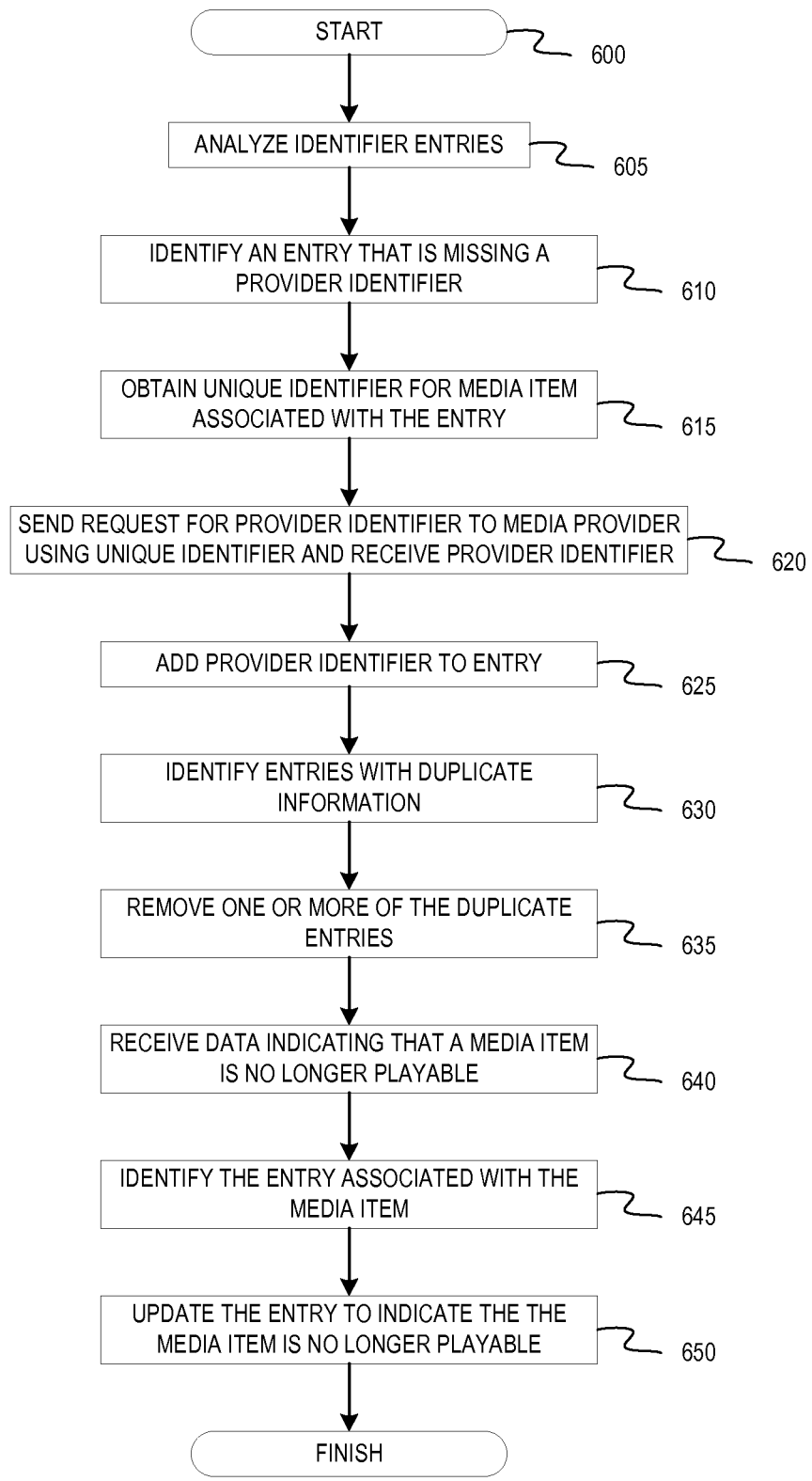
FIG. 6 is a flow diagram illustrating a method of aggregating or managing identifiers for media items, according to another embodiment.

FIGS. 5 through 6 are flow diagrams illustrating methods for aggregating or managing identifiers for media items. For simplicity of explanation, the methods are depicted and described as a series of acts. However, acts in accordance with this disclosure can occur in various orders and/or concurrently and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

FIG. 5 is a flow diagram illustrating a method 500 of aggregating or managing identifiers for media items according to one embodiment. The method 500 may be performed by processing logic that comprises hardware (e.g., circuitry, dedicated logic, programmable logic, microcode, etc.), software (e.g., instructions run on a processor to perform hardware simulation), or a combination thereof. In one embodiment, method 500 may be performed by a server device or by an identifier module, as illustrated in FIGS. 1B and 3.

Referring to FIG. 5, the method 500 begins at block 505 where the method 500 obtains a provider identifier for a media item (e.g., receives the provider identifier from an overlay application). The method 500 determines whether the provider identifier is included in any field or any portion of entries (e.g., identifier entries 131 illustrated in FIG. 1B) in a data store at block 510. If the provider entry already exists in an entry, the method 500 ends (e.g., the method 500 may refrain from creating a new entry or adding the provider identifier to an existing entry). If the provider identifier does not exist in any field or portion of the entries, the method 500 obtains media item metadata for the media item at block 515 (e.g., requests the media item metadata from a media provider using the provider identifier).

At block 520, the method 500 determines whether the media item metadata includes a unique identifier (e.g., an ISRC, an ISAN, an ISBN, etc.). If the media item metadata includes a unique identifier, the method 500 proceeds to block 525, where the method 500 determines whether the unique identifier is any field or portion of the entries. If the unique identifier exists in an entry, the method 500 adds the provider identifier to the entry that includes the unique identifier at block 530. After block 530, the method 500 ends. Referring back to block 525, if the unique identifier does not exist in any field or portion of the entries, the method 500 creates a new entry and a new internal identifier at block 535. At block 540, the method 500 adds the internal identifier, the provider identifier, and the unique identifier to the new created entry. In one embodiment, the method 500 may also request media data and may add the media data to the entry at block 540 (not shown in FIG. 5). After block 540, the method 500 ends.

Referring back to block 520, if media item metadata does not include a unique identifier, the method 500 proceeds to block 545 where the method 500 obtains media data (e.g., a title, an artist, a data, etc.) from the media item metadata. The method determines whether a portion of the media data (e.g., whether the title and artist) exist in a field or portion of the entries at block 550. If no portion of the media data exists in a field or portion of the entries, the method 500 proceeds to block 555, where the method 500 creates a new entry and a new internal identifier. At block 560, the method 500 adds the internal identifier, the provider identifier, and the media data to the new entry. After block 560, the method 500 ends. Referring back to block 550, if a portion of the media data does exist in the entries, the method 500 proceeds to block 565, where the method 500 adds the provider identifier to the entry that includes the portion of the media data. After block 565, the method 500 ends.

FIG. 6 is a flow diagram illustrating a method 600 of aggregating or managing identifiers for media items, according to another embodiment. The method 600 may be performed by processing logic that comprises hardware (e.g., circuitry, dedicated logic, programmable logic, microcode, etc.), software (e.g., instructions run on a processor to perform hardware simulation), or a combination thereof. In one embodiment, method 600 may be performed by a server device or by a data store module, as illustrated in FIGS. 1B and 4.

Referring to FIG. 6, the method 600 begins at block 605 where the method 600 analyzes identifier entries in a data store. At block 610, the method 600 identifies an entry that is missing a provider identifier for a media provider. At block 615, the method 600 obtains the unique identifier for the media item associated with the entry. The method 600 sends a request for the provider identifier to the media provider using the unique identifier at block 620. The method 600 also receives the provider identifier from the media provider at block 620. After receiving the provider identifier from the media provider, the method 600 adds the provider identifier to the entry that was missing the provider identifier (block 625).

At block 630, the method 600 identifies entries with duplicate information (e.g., duplicate identifiers or duplicate media data). The method 600 removes one or more of the duplicate entries at block 635 (e.g., may merge the duplicate entries into an existing entry). At block 640, the method 600 may receive data indicating that a media item is no longer playable (e.g., receive data from an overlay application indicating that a media item is no longer playable in a country or is no longer accessible from a media provider). The method 600 may identify the entry associated with the media item that is no longer playable (block 645). At block 650, the method 600 updates the entry to indicate the media item is no longer playable. After block 650, the method 600 ends.

In one embodiment, the method 600 may periodically perform some or all of the blocks 605 through 650. For example, the method 600 may perform one or more of blocks 605 through 625, blocks 630 through 635, and blocks 640 through 650 periodically (e.g., once every hour, once every week, once every two weeks, etc.).

Figure 7:
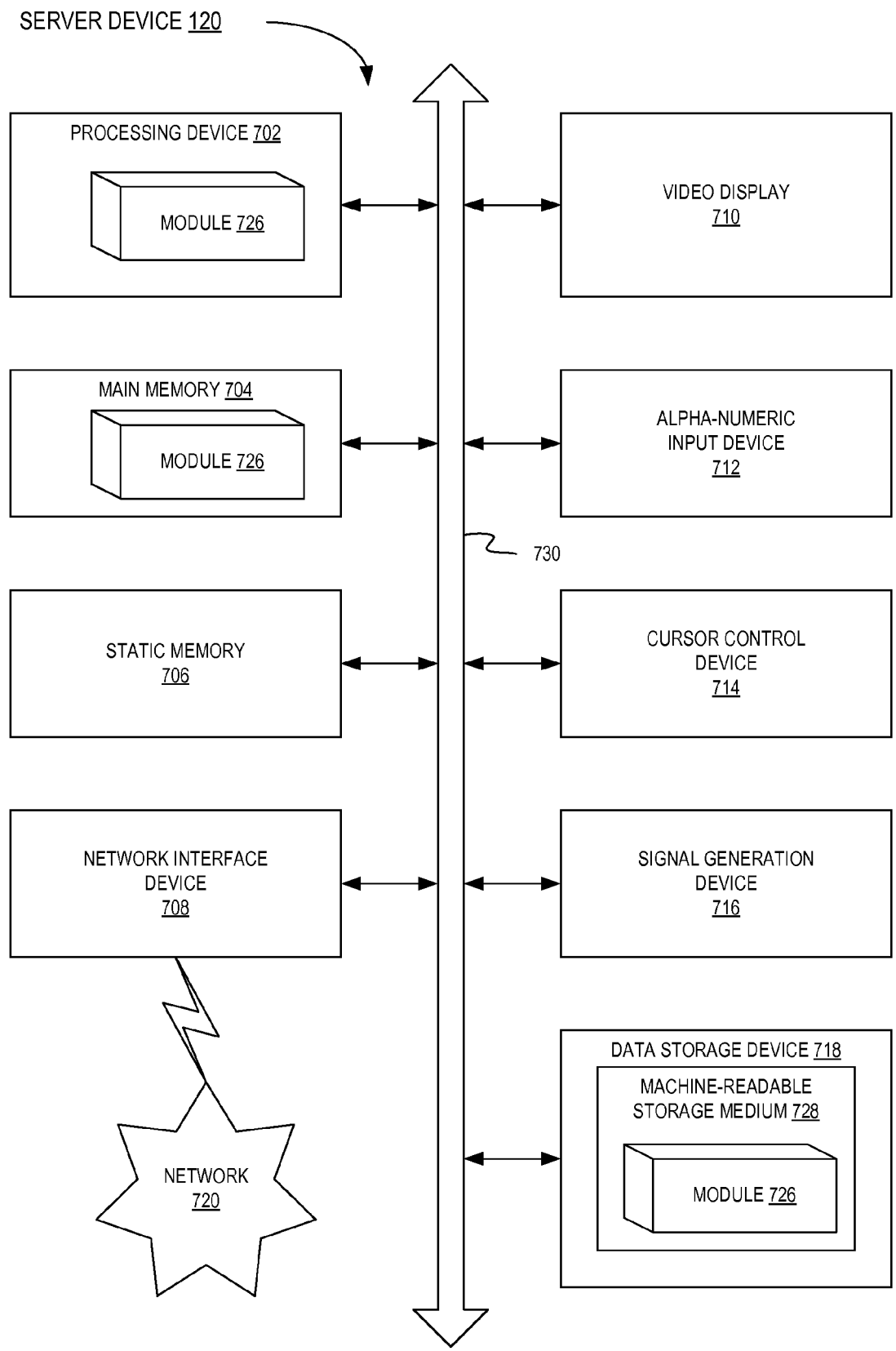
FIG. 7 is a block diagram of a service device in the example form of a computing device, in accordance with one embodiment.

FIG. 7 illustrates a diagrammatic representation of a server device 120 in the example form of a computing device within which a set of instructions, for causing the machine to perform any one or more of the methodologies discussed herein, may be executed. The server device 120 may be in the form of a computing device (e.g., a server computer) within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example server device 120 includes a processing device (e.g., a processor) 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)) and a data storage device 718, which communicate with each other via a bus 730.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also be one or more special-purpose processing devices such as an application specific integrated circuit (ASIC), a field programmable gate array (FPGA), a digital signal processor (DSP), network processor, or the like. The processing device 702 is configured to execute module 726 (e.g., an identifier module or a data store module) for performing the operations and steps discussed herein.

The server device 120 may further include a network interface device 708 which may communicate with a network 720. The server device 120 also may include a video display unit 710 (e.g., a liquid crystal display (LCD) or a cathode ray tube (CRT)), an alphanumeric input device 712 (e.g., a keyboard), a cursor control device 714 (e.g., a mouse) and a signal generation device 716 (e.g., a speaker). In one embodiment, the video display unit 710, the alphanumeric input device 712, and the cursor control device 714 may be combined into a single component or device (e.g., an LCD touch screen).

The data storage device 718 may include a computer-readable medium 728 on which is stored one or more sets of instructions (e.g., instructions of module 726, such as an identifier module or a data store module) embodying any one or more of the methodologies or functions described herein. The module 726 may (e.g., an identifier module or a data store module) also reside, completely or at least partially, within the main memory 704 and/or within the processing device 702 during execution thereof by the server device 120, the main memory 704 and the processing device 702 also constituting computer-readable media. The instructions may further be transmitted or received over a network 720 via the network interface device 708.

While the computer-readable storage medium 728 is shown in an example embodiment to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media.

In the above description, numerous details are set forth. It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "analyzing," "adding," "creating," "identifying," "sending," "removing," "merging," "updating," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

The above description sets forth numerous specific details such as examples of specific systems, components, methods and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth above are merely examples. Particular implementations may vary from these example details and still be contemplated to be within the scope of the present disclosure.

It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   receiving, from a first media provider, a provider identifier identifying a media item;
   determining, by a processing device, that the provider identifier is missing from an entry, for the media item, that is stored as one of a plurality of entries in a data store, wherein at least one of the plurality of entries in the data store has different provider identifiers associated with a single media item;
   requesting the provider identifier from the first media provider using a unique identifier for a media item associated with the entry;
   receiving the provider identifier from the first media provider;
   adding the provider identifier to the entry in the data store;
   receiving data indicating that a second media item is no longer playable;
   identifying a second entry in the data store, wherein the second entry is associated with the second media item; and
   updating the second entry in the data store to indicate that the second media item is no longer playable.

2. The method of claim 1, further comprising:
   receiving media item metadata for the media item from the first media provider; and
   determining whether the media item metadata comprises the unique identifier.

3. The method of claim 2, further comprising:
   in response to the media item metadata comprising the unique identifier:
      determining whether the unique identifier exists in any other entries of the plurality of entries; and
   in response to the media item metadata not comprising the unique identifier:
      analyzing the media item metadata to obtain media data for the media item; and
      determining whether the media data exists in any other entries of the plurality of entries.

4. The method of claim 3, wherein the metadata comprises at least one of an artist or a title.

5. The method of claim 1, wherein each entry in the plurality of entries comprises an internal identifier and at least one provider identifier, wherein each provider identifier in the at least one provider identifier is associated with one media provider of a plurality of media providers, wherein the internal identifier is not unique across a plurality of media providers and wherein the internal identifier is not received from the plurality of media providers.

6. The method of claim 2, wherein the unique identifier comprises at least one of an international standard recording code (ISRC) or an international standard audiovisual number (ISAN).

7. The method of claim 2, wherein the unique identifier comprises at least one of an international standard book number (ISBN), an international standard serial number (ISSN), an international standard music number (ISMN), an international standard musical work code (ISWC), an international standard text code (ISTC), a digital object identifier (DOI), or an international standard name identifier (ISNI).

8. The method of claim 2, wherein the unique identifier is unique across a plurality of media providers.

9. The method of claim 1, wherein the media item comprises at least one of a digital music item, a digital video item, or an electronic publication.

10. The method of claim 1, further comprising sending a request comprising the provider identifier, to the media provider.

11. The method of claim 1, further comprising:
identifying a first entry and a second entry that comprise duplicate information; and
removing the first entry or the second entry.

12. The method of claim 11, wherein removing the first entry or the second entry comprises:
merging the second entry into the first entry.

13. The method of claim 1, further comprising:
periodically analyzing the plurality of entries.

14. A non-transitory computer readable storage medium having instructions that, when executed by a processing device, cause the processing device to perform operations comprising:
receiving, from a first media provider, a provider identifier identifying a media item;
determining, by the processing device, that the provider identifier is missing from an entry, for the media item, that is known to be stored as one of a plurality of entries in a data store, wherein at least one of the plurality of entries in the data store has different provider identifiers associated with a single media item;
requesting the provider identifier from the first media provider using a unique identifier for a media item associated with the entry;
receiving the provider identifier from the first media provider;
adding the provider identifier to the entry in the data store;
receiving data indicating that a second media item is no longer playable;
identifying a second entry in the data store, wherein the second entry is associated with the second media item; and
updating the second entry in the data store to indicate that the second media item is no longer playable.

15. The non-transitory computer readable storage medium of claim 14, the operations further comprising:
receiving media item metadata for the media item from the first media provider; and
determining whether the media item metadata comprises the unique identifier.

16. The non-transitory computer readable storage medium of claim 14, wherein each entry in the plurality of entries comprises an internal identifier and at least one provider identifier, wherein each provider identifier in the at least one provider identifier is associated with one media provider of a plurality of media providers, wherein the internal identifier is not unique across a plurality of media providers and wherein the internal identifier is not received from the plurality of media providers.

17. The non-transitory computer readable storage medium of claim 15, wherein the unique identifier is unique across a plurality of media providers.

18. An apparatus, comprising:
a data store to store a plurality of entries;
a processing device, operatively coupled to the data store, the processing device to:
receive, from a first media provider, a provider identifier identifying a media item;
determine that the provider identifier is missing from an entry of the plurality of entries, for the media item, that is known to be stored as one of a plurality of entries in the data store, wherein at least one of the plurality of entries in the data store has different provider identifiers associated with a single media item;
request the provider identifier from the first media provider using a unique identifier for a media item associated with the entry;
receive the provider identifier from the first media provider;
add the provider identifier to the entry in the data store;
receive data indicating that a second media item is no longer playable;
identify a second entry in the data store, wherein the second entry is associated with the second media item; and
update the second entry in the data store to indicate that the second media item is no longer playable.

* * * * *